(12) United States Patent
Nuzman et al.

(10) Patent No.: US 8,537,655 B2
(45) Date of Patent: Sep. 17, 2013

(54) MULTIPLICATIVE UPDATING OF PRECODER OR POSTCODER MATRICES FOR CROSSTALK CONTROL IN A COMMUNICATION SYSTEM

(75) Inventors: Carl J. Nuzman, Union, NJ (US); Philip A. Whiting, New Providence, NJ (US)

(73) Assignee: Alcatel Lucent, Paris (FR)

( * ) Notice: Subject to any disclaimer, the term of this patent is extended or adjusted under 35 U.S.C. 154(b) by 280 days.

(21) Appl. No.: 13/016,376

(22) Filed: Jan. 28, 2011

(65) Prior Publication Data

US 2012/0195183 A1 Aug. 2, 2012

(51) Int. Cl.
*H04J 1/12* (2006.01)

(52) U.S. Cl.
USPC .......................................... 370/201

(58) Field of Classification Search
USPC ......... 370/203, 204–215, 229–240, 310–337, 370/338–350, 351–394, 395.1, 395.3, 395.4, 370/395.41, 395.42, 395.5, 395.52, 395.53, 370/412–421, 431–457, 458–463, 464–497, 370/498–552, 523–520, 521–529
See application file for complete search history.

(56) References Cited

U.S. PATENT DOCUMENTS

| | | | | |
|---|---|---|---|---|
| 2005/0152385 A1* | 7/2005 | Cioffi | ........................ | 370/420 |
| 2006/0029148 A1 | 2/2006 | Tsatsanis | | |
| 2009/0060013 A1* | 3/2009 | Ashikhmin et al. | ......... | 375/222 |
| 2009/0116582 A1 | 5/2009 | Ashikhmin et al. | | |
| 2009/0245081 A1 | 10/2009 | Ashikhmin et al. | | |
| 2010/0177855 A1 | 7/2010 | Ashikhmin et al. | | |
| 2010/0278033 A1* | 11/2010 | Ilani | .............................. | 370/201 |
| 2010/0329444 A1 | 12/2010 | Ashikhmin et al. | | |
| 2011/0110409 A1* | 5/2011 | Sands et al. | ................... | 375/222 |
| 2012/0224685 A1* | 9/2012 | Schenk et al. | ........... | 379/406.08 |

FOREIGN PATENT DOCUMENTS

EP   1936825 A1   6/2008

OTHER PUBLICATIONS

ITU-T Recommendation G.993.2, "Very High Speed Digital Subscriber Line Transceivers 2," Series G: Transmission Systems and Media, Digital Systems and Networks, Feb. 2006, 252 pages.
ITU-T Recommendation G.993.5, "Self-FEXT Cancellation (Vectoring) for Use with VDSL2 Transceivers," Series G: Transmission Systems and Media, Digital Systems and Networks, Apr. 2010, 80 pages.

* cited by examiner

*Primary Examiner* — Jung-Jen Liu
(74) *Attorney, Agent, or Firm* — Ryan, Mason & Lewis, LLP

(57) ABSTRACT

An access node of a communication system is configured to control crosstalk between channels of the system. Vectoring circuitry in the access node estimates crosstalk between channels of the system, generates a compensation matrix based on the crosstalk estimates, and generates compensated signals based on the compensation matrix. The compensation matrix, which may be a precoder matrix or a postcoder matrix, is generated using a multiplicative update process in which a previous version of the compensation matrix comprising one or more non-zero off-diagonal elements is updated by at least one of pre-multiplying by a first auxiliary matrix and post-multiplying by a second auxiliary matrix, with a given one of the auxiliary matrices also comprising one or more non-zero off-diagonal elements. The compensated signals may be pre-compensated signals or post-compensated signals.

24 Claims, 4 Drawing Sheets

MULTIPLICATIVE UPDATING OF PRECODER OR POSTCODER MATRICES FOR CROSSTALK CONTROL IN A COMMUNICATION SYSTEM

FIELD OF THE INVENTION

The present invention relates generally to communication systems, and more particularly to techniques for mitigating, suppressing or otherwise controlling interference between communication channels in such systems.

BACKGROUND OF THE INVENTION

Multi-channel communication systems are often susceptible to interference between the various channels, also referred to as crosstalk or inter-channel crosstalk. For example, digital subscriber line (DSL) broadband access systems typically employ discrete multi-tone (DMT) modulation over twisted-pair copper wires. One of the major impairments in such systems is crosstalk between multiple subscriber lines within the same binder or across binders. Thus, signals transmitted over one subscriber line may be coupled into other subscriber lines, leading to interference that can degrade the throughput performance of the system. More generally, a given "victim" channel may experience crosstalk from multiple "disturber" channels, again leading to undesirable interference.

Different techniques have been developed to mitigate, suppress or otherwise control crosstalk and to maximize effective throughput, reach and line stability. These techniques are gradually evolving from static or dynamic spectrum management techniques to multi-channel signal coordination.

By way of example, pre-compensation techniques allow active cancellation of inter-channel crosstalk through the use of a precoder. In DSL systems, the use of a precoder is contemplated to achieve crosstalk cancellation for downstream communications between a central office (CO) or another type of access node (AN) and customer premises equipment (CPE) units or other types of network terminals (NTs). It is also possible to implement crosstalk control for upstream communications from the NTs to the AN, using so-called post-compensation techniques implemented by a postcoder. Such pre-compensation and post-compensation techniques are also referred to as "vectoring," and include G.vector technology, which was recently standardized in ITU-T Recommendation G.993.5.

One known approach to estimating crosstalk coefficients for downstream or upstream crosstalk cancellation in a DSL system involves transmitting distinct pilot signals over respective subscriber lines between an AN and respective NTs of the system. Error feedback from the NTs based on the transmitted pilot signals is then used to estimate crosstalk. Other known approaches involve perturbation of precoder coefficients and feedback of signal-to-noise ratio (SNR) or other interference information.

Multiple subscriber lines that are subject to pre-compensation or post-compensation for crosstalk cancellation in a DSL system may be referred to as a vectoring group. In conventional DSL systems, the number of lines in a vectoring group is subject to practical limitations based on the processor and memory resources required to perform pre-compensation or post-compensation operations. Such operations include the computation of matrix-vector products using precoder and postcoder matrices, respectively. If there are N lines in the vectoring group, the precoder or postcoder matrices associated with a particular subcarrier, or tone, are typically of dimension N×N For example, a given matrix-vector product computed in the precoder may be given by y=Cx, where y is an N×1 vector of pre-compensated signals, x is a corresponding N×1 vector of signals prior to pre-compensation, and C is the N×N precoder matrix. The number of entries in the precoder matrix thus increases as the square of the number of lines N in the vectoring group.

The precoder matrix C is ideally the inverse of the channel matrix of the system, and therefore must be updated as the channel crosstalk characteristics change, for example, in conjunction with channel activation or deactivation. Ideally the updates should converge quickly to the ideal values. Also, transient events such as activation or deactivation should not cause problems on lines that are not involved in the transient events. For example, an active line should not experience errors when a neighboring line activates or deactivates.

In the above-noted conventional techniques, the precoder matrix C is typically updated using an additive update process in which the updates are performed on an entry-by-entry basis. This additive process generally involves subtracting one or more entries of a residual channel matrix from corresponding entries of the current precoder matrix, and as indicated previously, this subtraction operation is performed independently for each entry of the precoder matrix that is updated. However, the additive update process can be problematic when the dimension of the precoder matrix is large, or under conditions involving large amounts of crosstalk such that the magnitudes of the corresponding matrix elements are large. For example, the convergence of a sequence of updates may be slow, or the sequence of updates may not converge at all. Even in the case of convergence, some lines may experience significant transient increases in crosstalk when corrections are made to another line. This can cause errors or necessitate re-training.

Another possible approach is to maintain an actual channel matrix rather than a residual channel matrix, and then periodically compute the inverse of the channel matrix to determine the appropriate precoder matrix. The inverse computation may be repeated whenever any of the crosstalk estimates are updated. The problem with this approach is that computing the inverse of the channel matrix is computationally intensive, and therefore impractical for use with large vectoring groups.

Accordingly, for large values of N, the updating of the precoder matrix using conventional techniques can consume large amounts of processing and memory resources, and may also require a substantial amount of time to complete. As a result, implementation of effective crosstalk cancellation with a large vectoring group can be impractical using conventional techniques.

SUMMARY OF THE INVENTION

Illustrative embodiments of the invention provide improved techniques for generating pre-compensated or post-compensated signals for controlling crosstalk between channels of a communication system. For example, in one or more of these embodiments, a precoder or postcoder implemented at least in part by a vector processor is updated in a manner that exhibits improved convergence relative to a conventional additive update approach and requires reduced amounts of processor and memory resources relative to a conventional inverse computation approach.

In one aspect of the invention, an access node of a communication system is configured to control crosstalk between channels of the system. The access node may comprise, for example, a DSL access multiplexer of a DSL system. Vectoring circuitry in the access node estimates crosstalk between channels of the system, generates a compensation matrix based on the crosstalk estimates, and generates compensated signals based on the compensation matrix. The compensation matrix is generated using a multiplicative update process in which a previous version of the compensation matrix comprising one or more non-zero off-diagonal elements is updated by at least one of pre-multiplying by a first auxiliary matrix and post-multiplying by a second auxiliary matrix, with a given one of the auxiliary matrices also comprising one or more non-zero off-diagonal elements. The compensated signals may be pre-compensated signals or post-compensated signals.

As indicated previously, one or more of the illustrative embodiments overcome the convergence and transient crosstalk increase problems of conventional additive updates, as well as the excessive computational resource requirements of the conventional inverse computation updates, thereby permitting the use of much larger groups of vectored lines than would otherwise be possible. DSL systems implementing the disclosed techniques therefore exhibit reduced cost, lower power consumption, and enhanced throughput performance relative to conventional arrangements.

These and other features and advantages of the present invention will become more apparent from the accompanying drawings and the following detailed description.

DETAILED DESCRIPTION OF THE INVENTION

The present invention will be illustrated herein in conjunction with exemplary communication systems and associated techniques for crosstalk control in such systems. The crosstalk control may be applied substantially continuously, or in conjunction with activating or deactivating of subscriber lines or other communication channels in such systems, tracking changes in crosstalk over time, or in other line management applications. It should be understood, however, that the invention is not limited to use with the particular types of communication systems and crosstalk control applications disclosed. The invention can be implemented in a wide variety of other communication systems, and in numerous alternative crosstalk control applications. For example, although illustrated in the context of DSL systems based on DMT modulation, the disclosed techniques can be adapted in a straightforward manner to a variety of other types of wired or wireless communication systems, including cellular systems, multiple-input multiple-output (MIMO) systems, Wi-Fi or WiMax systems, etc. The techniques are thus applicable to other types of orthogonal frequency division multiplexing (OFDM) systems outside of the DSL context, as well as to systems utilizing higher order modulation in the time domain.

Figure 1:
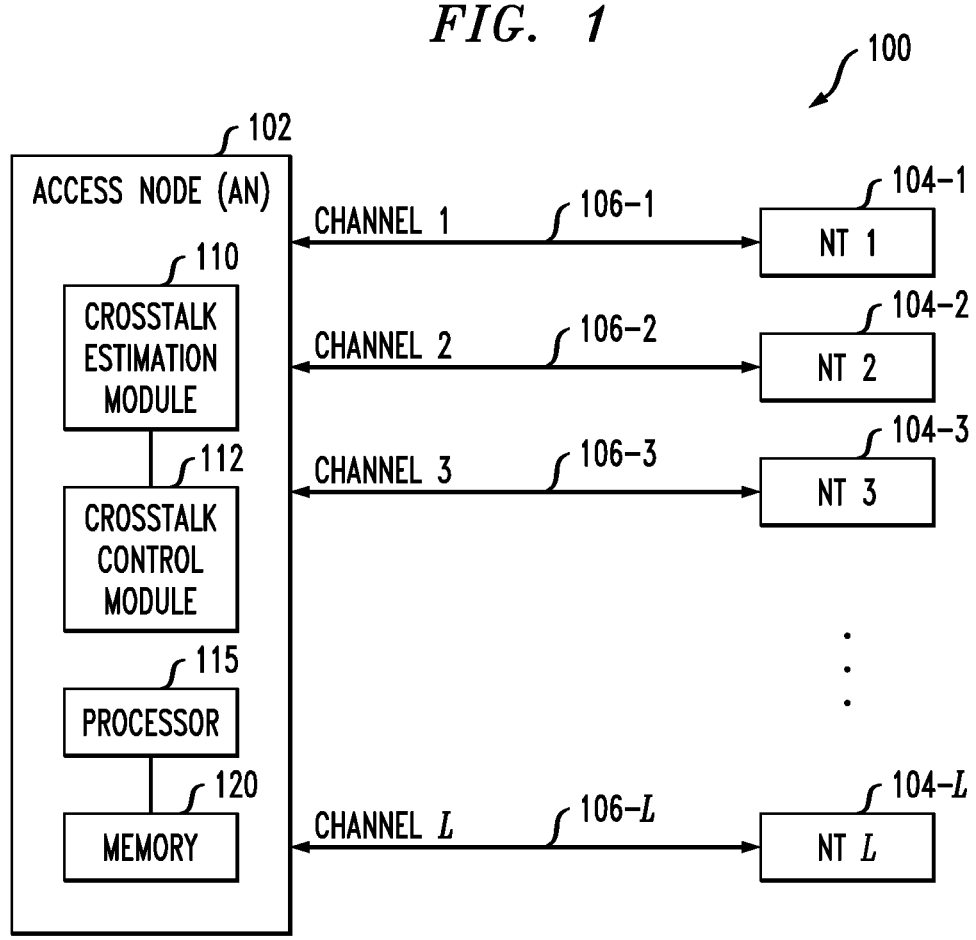
FIG. 1 is a block diagram of a multi-channel communication system in an illustrative embodiment of the invention.

FIG. 1 shows a communication system 100 comprising an access node (AN) 102 and network terminals (NTs) 104. The NTs 104 more particularly comprise L distinct NT elements that are individually denoted NT 1, NT 2, . . . NT L, and are further identified by respective reference numerals 104-1, 104-2, . . . 104-L as shown. A given NT element may comprise, by way of example, a modem, a computer, or other type of communication device, or combinations of such devices. The access node 102 communicates with these NT elements via respective channels 106-1, 106-2, . . . 106-L, also denoted Channel 1, Channel 2, . . . Channel L.

As indicated previously herein, in an embodiment in which system 100 is implemented as a DSL system, the AN 102 may comprise, for example, a central office (CO), and the NTs 104 may comprise, for example, respective instances of customer premises equipment (CPE) units. The channels 106 in such a DSL system comprise respective subscriber lines. Each such subscriber line may comprise, for example, a twisted-pair copper wire connection. The lines may be in the same binder or in adjacent binders, such that crosstalk can arise between the lines. Portions of the description below will assume that the system 100 is a DSL system, but it should be understood that this is by way of example only.

In an illustrative DSL embodiment, fewer than all of the L lines 106-1 through 106-L may be initially active lines, and at least one of the L lines may be a "joining line" that is to be activated and joined to an existing set of active lines. Such a joining line is also referred to herein as an "activating line." As indicated previously, a given set of lines subject to crosstalk control may be referred to herein as a vectoring group.

Communications between the AN 102 and the NTs 104 include both downstream and upstream communications for each of the active lines. The downstream direction refers to the direction from AN to NT, and the upstream direction is the direction from NT to AN. Although not explicitly shown in FIG. 1, it is assumed without limitation that there is associated with each of the subscriber lines of system 100 an AN transmitter and an NT receiver for use in communicating in the downstream direction, and an NT transmitter and an AN receiver for use in communicating in the upstream direction. A given module combining an AN transmitter and an AN receiver, or an NT transmitter and an NT receiver, is generally referred to herein as a transceiver. The corresponding transceiver circuitry can be implemented in the AN and NTs using well-known conventional techniques, and such techniques will not be described in detail herein.

The AN 102 in the present embodiment comprises a crosstalk estimation module 110 coupled to a crosstalk control module 112. The AN utilizes the crosstalk estimation module to obtain estimates of crosstalk between respective pairs of at least a subset of the lines 106. The crosstalk control module 112 is used to mitigate, suppress or otherwise control crosstalk between at least a subset of the lines 106 based on the crosstalk estimates. For example, the crosstalk control module may be utilized to provide pre-compensation of downstream signals transmitted from the AN to the NTs, and additionally or alternatively post-compensation of upstream signals transmitted from the NTs to the AN. More detailed examples of respective pre-compensation and post-compensation techniques implemented in illustrative embodiments of the invention will be described below in conjunction with FIGS. 4 and 5.

The crosstalk estimation module 110 may be configured to generate crosstalk estimates from error samples, SNR values or other types of measurements generated in the AN 102 based on signals received from the NTs 104, or measurements generated in the NTs 104 and fed back to the AN 102 from the NTs 104. It should be noted that the term SNR as used herein is intended to be broadly construed so as to encompass other similar measures, such as signal-to-interference-plus-noise ratios (SINRs).

In other embodiments, crosstalk estimates may be generated outside of the AN 102 and supplied to the AN for further processing. For example, such estimates may be generated in the NTs 104 and returned to the AN for use in pre-compensation, post-compensation, or other crosstalk control applications. The crosstalk estimates may also be referred to as crosstalk channel coefficients, crosstalk cancellation coefficients, or simply crosstalk coefficients.

The crosstalk estimation module 110 may incorporate interpolation functionality for generating interpolated crosstalk estimates. Examples of interpolation techniques that may be utilized with the present invention are disclosed in U.S. Patent Application Publication No. 2009/0116582, entitled "Interpolation Method and Apparatus for Increasing Efficiency of Crosstalk Estimation," which is commonly assigned herewith and incorporated by reference herein.

The AN 102 may also or alternatively be configured to implement a technique for channel estimation using linear-model interpolation. In implementing such a technique, the AN transmits the pilot signals over respective ones of the lines 106. Corresponding measurements such as error samples or SNR values are fed back from the NTs to the AN and utilized to generate crosstalk estimates in crosstalk estimation module 110. The AN then performs pre-compensation, post-compensation or otherwise controls crosstalk based on the crosstalk estimates. Additional details regarding these and other similar arrangements are described in U.S. patent application Ser. No. 12/493,328, filed Jun. 29, 2009 and entitled "Crosstalk Estimation and Power Setting Based on Interpolation in a Multi-Channel Communication System," which is commonly assigned herewith and incorporated by reference herein.

The crosstalk estimation module 110 may incorporate denoising functionality for generating denoised crosstalk estimates. Examples of crosstalk estimate denoising techniques suitable for use with embodiments of the invention are described in U.S. Patent Application Publication No. 2010/0177855, entitled "Power Control Using Denoised Crosstalk Estimates in a Multi-Channel Communication System," which is commonly assigned herewith and incorporated by reference herein. It is to be appreciated, however, that the present invention does not require the use of any particular denoising techniques. Illustrative embodiments to be described herein may incorporate denoising functionality using frequency filters as part of a channel coefficient estimation process.

The AN 102 further comprises a processor 115 coupled to a memory 120. The memory may be used to store one or more software programs that are executed by the processor to implement the functionality described herein. For example, functionality associated with crosstalk estimation module 110 and crosstalk control module 112 may be implemented at least in part in the form of such software programs. The memory is an example of what is more generally referred to herein as a computer-readable storage medium that stores executable program code. Other examples of computer-readable storage media may include disks or other types of magnetic or optical media.

It is to be appreciated that the AN 102 as shown in FIG. 1 is just one illustration of an "access node" as that term is used herein. Such an access node may comprise, for example, a DSL access multiplexer (DSLAM). However, the term "access node" as used herein is intended to be broadly construed so as to encompass, for example, a particular element within a CO, such as a DSLAM, or the CO itself, as well as other types of access point elements in systems that do not include a CO.

In the illustrative embodiment of FIG. 1 the lines 106 are all associated with the same AN 102. However, in other embodiments, these lines may be distributed across multiple access nodes. Different ones of such multiple access nodes may be from different vendors. For example, it is well known that in conventional systems, several access nodes of distinct vendors can be connected to the same bundle of DSL lines. Under these and other conditions, the various access nodes may have to interact with one another in order to achieve optimal interference cancellation.

Each of the NTs 104 may be configurable into multiple modes of operation responsive to control signals supplied by the AN 102 over control signal paths, as described in U.S. Patent Application Publication No. 2009/0245081, entitled "Fast Seamless Joining of Channels in a Multi-Channel Communication System," which is commonly assigned herewith and incorporated by reference herein. Such modes of operation may include, for example, a joining mode and a tracking mode. However, this type of multiple mode operation is not a requirement of the present invention.

An exemplary DSL implementation of the system 100 of FIG. 1 that is configured to perform at least one of pre-compensation and post-compensation will be described below with reference to FIGS. 2 through 5. More specifically, this implementation includes a precoder providing active crosstalk cancellation for downstream communications from AN 102 to the NTs 104, and also includes a postcoder providing active crosstalk cancellation for upstream communications from the NTs 104 to the AN 102. However, the techniques disclosed herein are applicable to systems involving symmetric communications in which there is no particular defined downstream or upstream direction.

Figure 2:
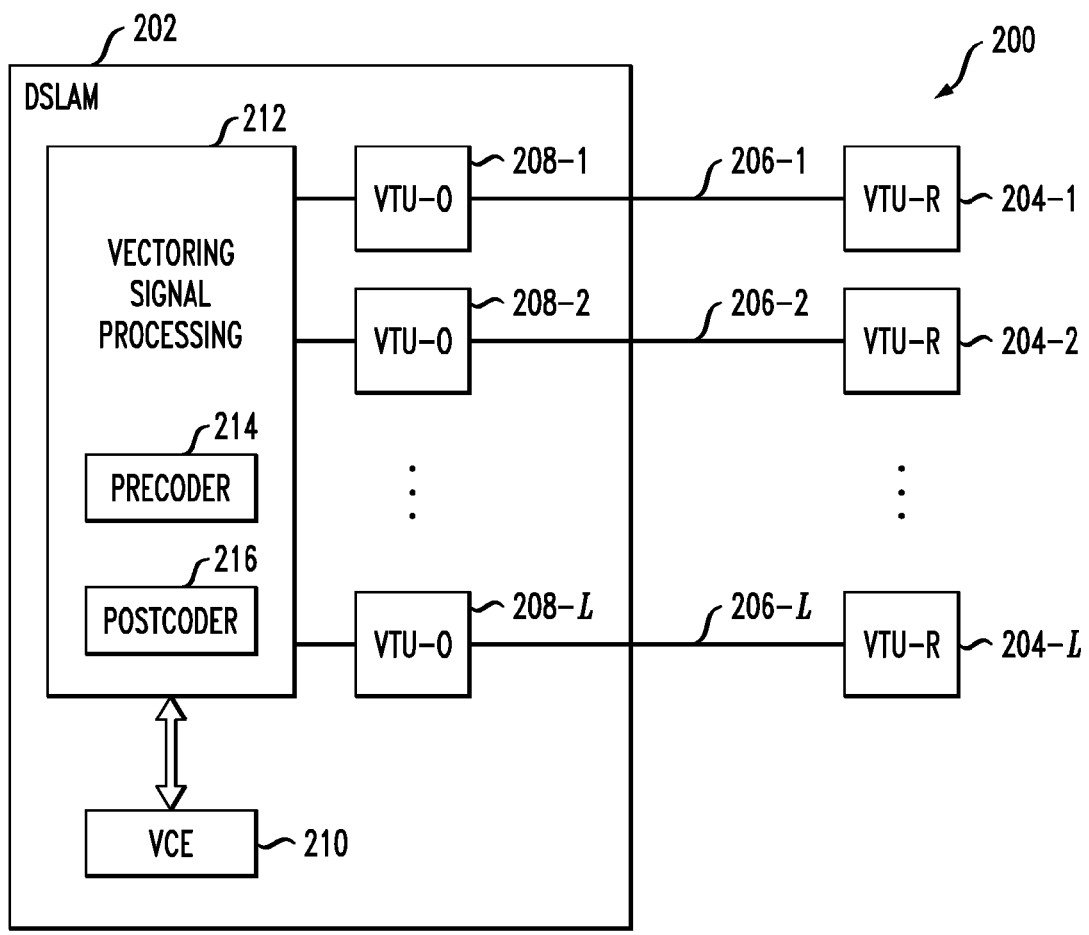
FIG. 2 shows an exemplary DSL implementation of the FIG. 1 communication system in an illustrative embodiment.

Referring now to FIG. 2, vectored DSL system 200 represents a possible implementation of the multi-channel communication system 100 previously described. A DSLAM 202 in an operator access node connects to a plurality of CPE units 204 via respective copper twisted pair lines 206 that may be in a common binder. The CPE units 204 more specifically comprise remote VDSL transceiver units (VTU-Rs) 204-1, 204-2, ... 204-L. These VTU-Rs communicate with respective operator-side VDSL transceiver units (VTU-Os) 208-1, 208-2, ... 208-L. The DSLAM 202 further comprises a vector control entity (VCE) 210 and a vectoring signal processing module 212. The vectoring signal processing module 212 comprises a precoder 214 and a postcoder 216. The VCE 210 and vectoring signal processing module 212 may be viewed as corresponding generally to crosstalk estimation module 110 and crosstalk control module 112 of system 100. Such elements are considered examples of what is more generally referred to herein as "vectoring circuitry."

In the FIG. 2 embodiment, it is assumed without limitation that the VTU-Rs 204 and corresponding VTU-Os 208 operate in a manner compliant with a particular vectoring standard, and more specifically the G.vector standard disclosed in ITU-T Recommendation G.993.5, "Self-FEXT cancellation (vectoring) for use with VDSL2 transceivers," April 2010, which is incorporated by reference herein. It should be noted that use of this particular standard is by way of illustrative example only, and the techniques of the invention can be adapted in a straightforward manner to other types and arrangements of AN and NT elements suitable for performing vectoring or other similar crosstalk control operations.

Figure 3:
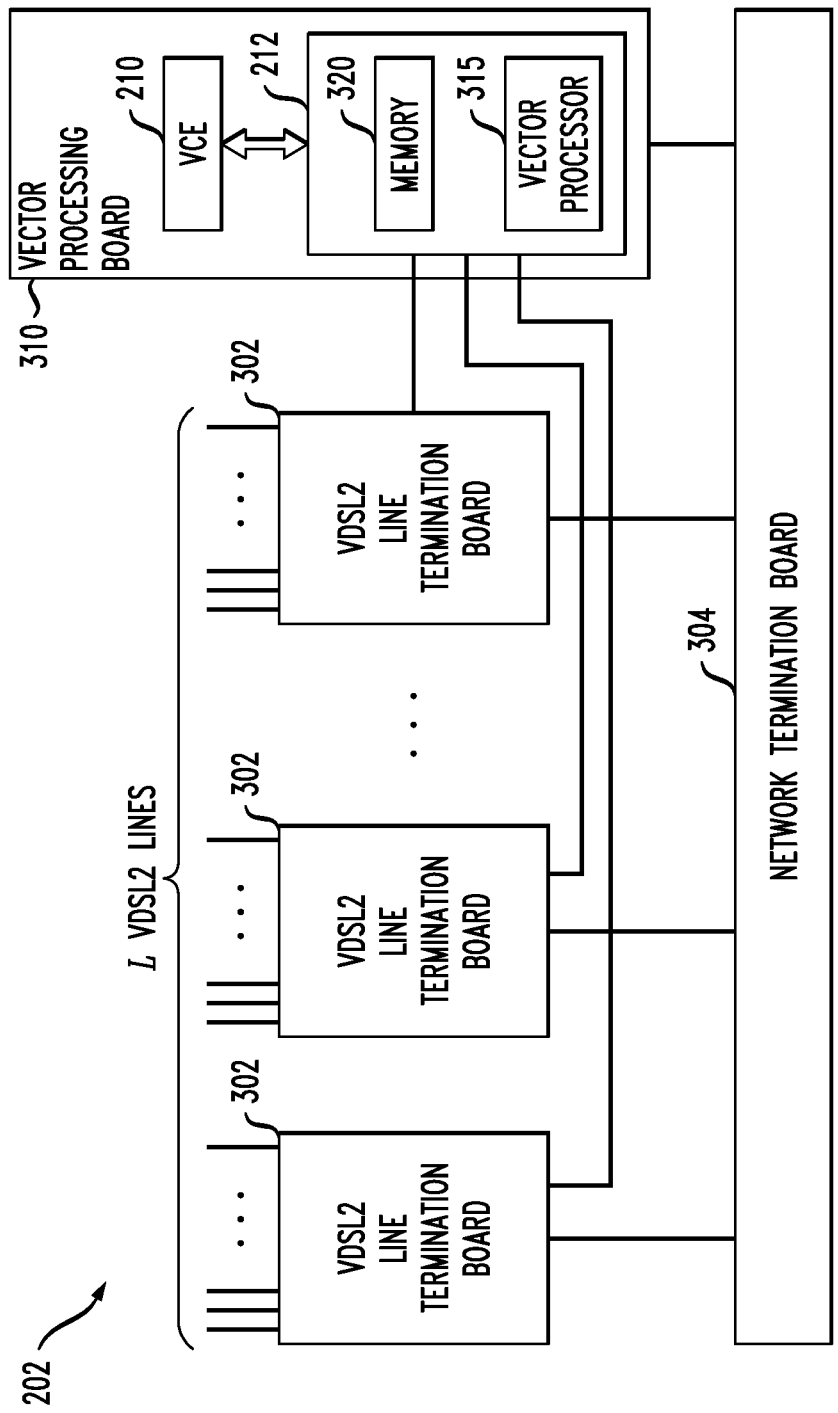
FIG. 3 shows a more detailed view of one possible implementation of a portion of a DSL access multiplexer of the FIG. 2 system.

FIG. 3 shows a more detailed view of one possible implementation of a portion of the DSLAM 202 of FIG. 2. In this exemplary implementation, the DSLAM 202 comprises a plurality of VDSL2 line termination boards 302 that are coupled to a network termination board 304 and to a vector processing board 310. The vector processing board 310 includes the VCE 210 and the vectoring signal processing module 212, and may also include additional vectoring circuitry not explicitly shown but commonly included in a conventional implementation of such a vector processing board. The vectoring signal processing module 212 includes vector processor 315 and its associated external memory 320. The operation of the vector processor 315 will be described in greater detail below in conjunction with FIGS. 4 and 5.

The vectoring signal processing unit 212 in DSLAM 202 is configured under control of the VCE 210 to implement precompensation for signals transmitted in the downstream direction and post-compensation for signals received in the upstream direction. Effective implementation of these precompensation and post-compensation crosstalk control techniques requires the performance of operations such as computing matrix-vector products using respective precoder and postcoder matrices. However, as indicated previously, a conventional additive approach to precoder or postcoder updates can exhibit convergence problems and possible significant transient increases in crosstalk, while a conventional inverse computation approach to precoder or postcoder updates can consume large amounts of processing and memory resources and may also require a substantial amount of time to complete. As a result, implementation of effective crosstalk cancellation with a large vectoring group can be impractical using conventional techniques.

Illustrative embodiments of the present invention overcome the above-noted problems associated with conventional precoder and postcoder update approaches by providing particularly efficient techniques for multiplicative updating of the precoder and postcoder matrices utilized in precoder 214 and postcoder 216, respectively. As will be described, in one or more of these embodiments, a precoder or postcoder matrix is generated using a multiplicative update process. In the multiplicative update process, by way of example, the precoder matrix is updated by pre-multiplying by a first auxiliary matrix, and the postcoder matrix is updated by post-multiplying by a second auxiliary matrix, where a given one of the auxiliary matrices comprises one or more non-zero off-diagonal elements. The precoder or postcoder matrices prior to update have one or more non-zero off-diagonal elements. The updates to the precoder or postcoder matrices may occur in conjunction with designated events, such as activation of a joining line, deactivation of a previously-active line, or expiration of a specified periodic tracking interval.

The multiplicative update process will initially be described with reference to updating of the precoder matrix. In this case, the auxiliary matrix used to pre-multiply the precoder matrix is a function of a residual channel matrix. For example, the auxiliary matrix can be the inverse of a resultant channel matrix, or an approximation of the inverse of the resultant channel matrix, formed by subtracting the residual channel matrix from an identity matrix. In the following, the resultant channel matrix is denoted R and is given by the product of an uncompensated normalized channel matrix H and the precoder matrix C:

$$R=HC.$$

The uncompensated normalized channel matrix H may be written as the sum of an identity matrix I and a crosstalk coefficient matrix G, and thus R may be written as:

$$R=(I+G)C.$$

We assume that the diagonal channel elements are normalized to one by the action of a frequency-domain equalizer. Ideally, the precoder matrix C will be the inverse of the uncompensated channel matrix H, such that the resultant channel matrix R is equal to I. The error relative to this ideal case is referred to as the residual channel and is characterized by a residual channel matrix that is denoted E and given by:

$$E=(I+G)C-I$$

One or more of the exemplary multiplicative update processes disclosed herein may be characterized as providing a means of inverting a fixed but unknown matrix X drawn from a class of matrices X by use of noisy measurements of the error matrix E. The error matrix E may be written in terms of the unknown matrix X as follows:

$$E=XC-I,$$

where the precoder matrix C may be characterized as the current estimate of the inverse of the unknown matrix X. One or more of the multiplicative update processes to be described advantageously require only minimal assumptions for the class of matrices X which are to be inverted. An example of a given set of such minimal assumptions is that the magnitudes of the entries are bounded and that the absolute determinant of all the matrices in the class is bounded away from zero:

$$\inf_{X \in \mathcal{X}} |X| \geq \eta > 0,$$

where η denotes a specified bound.

In an exemplary multiplicative update process, an updated precoder matrix C' may generated as a product of the current precoder matrix C and an auxiliary matrix given by the inverse of the resultant channel matrix R, as follows:

$$C''=CR^{-1},$$

which gives a new resultant channel matrix R'=I, and thus corresponds to the ideal case noted above. As noted previously, an alternative approach is to use an auxiliary matrix that is an approximation of the inverse of the resultant channel matrix R, and is formed by subtracting the residual channel matrix E from identity matrix I. This multiplicative update process therefore makes the approximation $R^{-1} \approx (I-E)$ and then multiplies the current precoder matrix C on the right by I−E. The updated precoder matrix C' is then given by:

$$C''=C(I-E),$$

and so the updated residual channel matrix E' is given by:

$$E'=(I+G)C(I-E)-I=E-(I+G)CE=-E^2.$$

The entries of the current residual channel matrix E are normally much smaller than the entries of the current crosstalk coefficient matrix G, and so the above-noted result of the approximate multiplicative update, $-E^2$, is normally much smaller than the result of a typical additive update, which is given by C''=C−E such that E'=−GE.

The multiplicative update process described above has particular advantages when changing the precoder matrix size incrementally, i.e., when adding or removing an active line from the set of precoded lines. In such cases, non-zero elements of E may be confined to the off-diagonal elements of a single row or column, and $E^2=0$. Therefore, (I−E) turns out to be the exact inverse of (I+E), and the approximate multiplicative update is the same as the ideal multiplicative update.

When the residual channel matrix E consists of a single non-zero matrix element, then the operation of multiplying the precoder C by the matrix (I–E) can be expressed as an operation of adding a scaled multiple of one column of C to another column of C. This illustrates a general principle, that to obtain the benefits of this approach, it is advantageous to update multiple elements of a given column of C simultaneously, rather than simply updating individual matrix elements.

In the upstream direction, the system is defined similarly, but with respect to a postcoder rather than a precoder. The resultant channel is $$R=QC(I+G)D,$$

where C is the postcoder, (I+G) is the uncompensated normalized channel, D is a diagonal matrix of direct gains, and Q is a diagonal matrix of frequency-domain equalizer coefficients, with QD=I. The raw residual channel matrix is defined as $$\tilde{E}=QC(I+G)D-I$$

and the adjusted residual channel matrix is $$E=D\tilde{E}Q=C(I+G)-I.$$

Unless otherwise specified, when referring to the upstream direction, the residual channel matrix should be understood to mean the adjusted residual channel matrix E.

The multiplicative update process described previously for a precoder can be adapted in a straightforward manner for updating a postcoder. The operation is similar, except that the postcoder matrix is post-multiplied by an auxiliary matrix, rather than pre-multiplied by an auxiliary matrix. This corresponds to a row-by-row update of the postcoder matrix, in a manner analogous to a column-by-column update of the precoder matrix.

More specifically, column k of the precoder matrix controls what happens to data symbols from user k. The column should always be updated such that a full, unit signal is received at receiver k, and as little as possible appears at the other receivers. Changes to column k have no effect on data symbols of other users, and so the column can be updated independently of any other column.

Similarly, row k of the postcoder matrix controls the way in which raw received symbols on all lines are combined to form a compensated received symbol for user k. Changes to row k have no effect on the compensated received symbol for any other user, and so row k may be updated independently of any other row.

Figure 4:
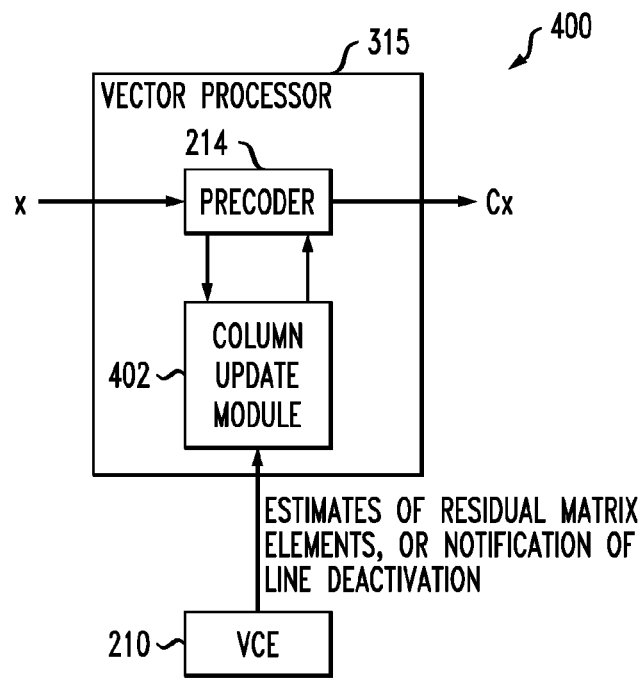
FIG. 4 illustrates a vector processor in the FIG. 3 DSL access multiplexer comprising a column update module for multiplicative updating of precoder matrix entries.
Figure 5:
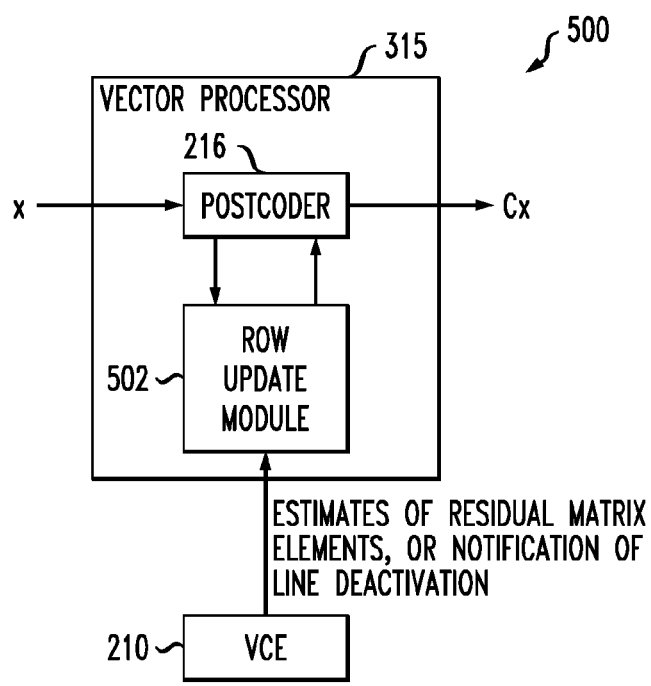
FIG. 5 illustrates a vector processor in the FIG. 3 DSL access multiplexer comprising a row update module for multiplicative updating of postcoder matrix entries.

FIGS. 4 and 5 show exemplary implementations of vectoring circuitry 400 and 500 for performing multiplicative update processes for the precoder and postcoder matrices utilized in precoder 214 and postcoder 216, respectively.

As illustrated in FIG. 4, vector processor 315 comprises precoder 214 coupled to a column update module 402. The column update module is configured to perform multiplicative updates of entries of the precoder matrix of precoder 214 on a column-by-column basis using an auxiliary matrix. The multiplicative update process more specifically comprises performing multiplicative updates of entries of the precoder matrix on a column-by-column basis by pre-multiplying the precoder matrix by the auxiliary matrix. For example, as noted previously, the column-by-column multiplicative updates performed on entries of the precoder matrix may comprise subtracting a multiple of one column of the precoder matrix from another column of the precoder matrix.

Similarly, vector processor 315 as shown in FIG. 5 comprises postcoder 216 coupled to a row update module 502. The row update module is configured to perform multiplicative updates of entries of the postcoder matrix of postcoder 216 on a row-by-row basis using an auxiliary matrix. The multiplicative update process more specifically comprises performing multiplicative updates of entries of the postcoder matrix on a row-by-row basis by post-multiplying the postcoder matrix by the auxiliary matrix. For example, the row-by-row multiplicative updates performed on entries of the postcoder matrix may comprise subtracting a multiple of one row of the postcoder matrix from another row of the postcoder matrix.

In the embodiments of FIGS. 4 and 5, the VCE 210 is coupled to the column update module 402 or row update module 502, and provides estimates of residual matrix elements, or notification of line deactivation.

It should be noted that in a typical pre-compensation or post-compensation arrangement with N input and N outputs, each output is produced by multiplying each input by some coefficient, and then adding up the products. In such an arrangement, a column generally refers to all of the coefficients that are multiplied by a given input, in forming the various outputs, while a row generally refers to all of the coefficients that are used in the products added up to obtain a given output. Alternative definitions of columns and rows may be used in other embodiments of the invention.

It is also to be appreciated that in performing multiplicative updates for a precoder matrix on a column-by-column basis, all coefficients in a given column should generally be updated at substantially the same time. Thus, a current set of values is used to pre-compensate one transmitted signal, and then an updated set of values is used to pre-compensate the next transmitted signal. If instead the update is done in several steps so that various transmitted signals are pre-compensated by a matrix in which only some of the column elements have been updated, then those signals will generally be negatively affected, for example by having additional crosstalk observed at the receiver. Similarly, when performing multiplicative updates for a postcoder matrix on a row-by-row basis, all coefficients in a given row should generally be updated at substantially the same time.

More detailed multiplicative update processes will be described in greater detail below in exemplary deactivation, activation and tracking scenarios, for both downstream and upstream directions. The multiplicative updates processes may be implemented by the vectoring circuitry 400 or 500 comprising respective column update module 402 and row update module 502, as illustrated in FIGS. 4 and 5.

Deactivation

In this section, we consider an exemplary deactivation scenario in which N members of a vectoring group are active, and one of the members deactivates. The precoder matrix in this scenario needs to be updated from an N×N matrix (which is ideally the inverse of an N×N channel matrix) to an (N−1)×(N−1) matrix (which is ideally the inverse of an (N−1)×(N−1) channel matrix).

Suppose first that crosstalk is sufficiently small that first-order approximation $(I+G)^{-1}=I-G$ is very accurate. Then, it can be seen that the inverse of an (N−1)×(N−1) submatrix of I+G is just an (N−1)×(N−1) submatrix of the inverse of I+G. In this case all that is required for deactivation of a given line is to eliminate the appropriate row and column of the current precoder matrix, reverting to an (N−1)×(N−1) precoder that is a submatrix of the previous precoder matrix.

However, if the first-order approximation is not sufficiently accurate, then the above approach will cause the SNR of active lines to drop during a deactivation event. The drop is because we are moving from a perfect N×N inverse precoder to an imperfect (N−1)×(N−1) inverse precoder.

We have recognized that all of the information needed to move to a perfect $(N-1)\times(N-1)$ inverse precoder is contained in the $N\times N$ precoder. Let S denote the set of active lines (after the deactivation) and let d denote the index of the deactivating line. Based on these sets, we can decompose the precoder C into four submatrices: the $(N-1)\times(N-1)$ submatrix $C_{SS}$, the $(N-1)\times 1$ submatrix $C_{Sd}$, the $1\times(N-1)$ submatrix $C_{dS}$, and the scalar $C_{dd}$. If C is the inverse of an $N\times N$ channel matrix H, then the inverse of $(N-1)\times(N-1)$ channel matrix $H_{SS}$ is given by:

$$(H_{SS})^{-1} = C_{SS} - C_{Sd}C_{dS}C_{dd}^{-1}$$

This equation holds for both downstream and upstream operation. The only difference is that in the downstream, each column may be updated independently, while in the upstream each row may be updated independently. The operation which moves from the $N\times N$ precoder to the $(N-1)\times(N-1)$ precoder can be described as pre-multiplying the $N\times N$ precoder by an auxiliary matrix. In this case, the auxiliary matrix is defined by taking an $N\times N$ identity matrix, replacing the off-diagonal elements of row d with $-C_{dS}/C_{dd}$, and setting the diagonal element of row d to zero. Similarly, the upstream operation can be described as post-multiplying by an auxiliary matrix. The operations are described more explicitly below. Denote by $C_{v,d}^{k}[t]$ the precoder or postcoder coefficient for victim v, disturber d, on tone k at step t. The procedures below will replace $C[t]$ with an updated matrix $C[t+1]$.

It should be noted that the set of active lines S is actually tone dependent, and may be denoted $S_k$. For example, in scenarios with heterogeneous lines, low frequencies will typically have more active lines than high frequencies. This may impact the order in which various operations are carried out, for example.

In the downstream direction, the multiplicative update process for the case of a deactivating line is as follows:
1. Begin with N active lines $S\cup\{d\}$.
2. VCE indicates that line d is deactivating.
3. For each tone k, update the precoder matrix as follows:
   (a) Compute and store the N-1 values $v_n = C_{n,d}^{k}[t]/C_{d,d}^{k}[t]$, for each n∈S. Such values could be stored in place of the coefficient $C_{n,d}^{k}[t]$ which is no longer needed.
   (b) For each active line m∈S, update column m of the precoder matrix:
      i. For each line n∈S, compute $C_{n,m}^{k}[t+1] = C_{n,m}^{k}[t] - C_{d,m}^{k}[t]v_n$.
      ii. Set $C_{d,m}^{k}[t+1] = 0$.
      iii. Column m of $C[t+1]$ may now go live, i.e., be used for precoding.
4. Set $C_{n,d}^{k}[t+1] = 0$ for all n∈S∪{d}.

In the upstream direction, the multiplicative update process for the case of a deactivating line is as follows:
1. Begin with N active lines $S\cup\{d\}$.
2. VCE indicates that line d is deactivating.
3. For each tone k, update the postcoder matrix:
   (a) Compute and store the N-1 values $v_n = C_{d,n}^{k}[t]/C_{d,d}^{k}[t]$, for each n∈S. Such values could be stored in place of the coefficient $C_{d,n}^{k}[t]$ which is no longer needed.
   (b) For each active line m∈S, update row m of the precoder:
      i. For each line n∈S, compute $C_{m,n}^{k}[t+1] = C_{m,n}^{k}[t] - C_{m,d}^{k}[t]v_n$.
      ii. Set $C_{m,d}^{k}[t+1] = 0$.
      iii. Row m of $C[t+1]$ may now go live, i.e., be used for postcoding.
4. Set $C_{d,n}^{k}[t+1] = 0$ for all n∈S∪{d}.

The end result for the upstream direction is substantially the same as that in the downstream direction. However, the operations are ordered slightly differently since the updates for the upstream direction may go live row by row.

Activation

In this section, we consider an exemplary activation scenario in which N members of a vectoring group are active, and a new member activates. The precoder matrix in this scenario needs to be updated from an $N\times N$ matrix to an $(N+1)\times(N+1)$ matrix. The original set of active lines is denoted by S, and the index of the activating line is a. The estimated residual crosstalk from disturber d into victim v on tone k will be denoted $\hat{E}_{v,d}^{k}$. This estimate may be obtained using well-known conventional techniques such as, for example, correlating pilot signals with receiver errors.

In the downstream direction, the multiplicative update proceeds in two stages, corresponding to the O-P-VECTOR-1 and O-P-VECTOR-2 stages of G.vector initialization, respectively.

During O-P-VECTOR-1, we obtain crosstalk estimates $\hat{E}_{S,a}$, residual crosstalk from the activating line into the active lines, also referred to as "showtime" lines. The precoder matrix is updated in order to drive this residual crosstalk toward zero. Once this step is finished the activating line will be able to start transmitting the normal initialization signals without degrading the SNR of the showtime lines.

In this phase only column a of the precoder matrix is updated. More specifically, the column of error estimates $\hat{E}_{S,a}$ are multiplied by the current precoder matrix $C_{SS}$ before being subtracted from current precoder values, as follows:
1. Set time counter to t=0.
2. Initialize column a of the precoder matrix, using either column a of an identity matrix, or using a priori estimates (e.g., from historical information). That is, in the former case, set $C_{n,a}[t]=0$ for all n∈S and $C_{a,a}[t]=1$.
3. Obtain residual crosstalk estimates $\hat{E}_{n,a}^{k}[t]$ for all n∈S and all tones k.
4. For all tones k and lines n∈S, compute $$C_{n,a}^{k}[t+1] = C_{n,a}^{k}[t] - \sum_{p\in S} C_{n,p}^{k}[t]\hat{E}_{p,a}^{k}$$

and then increment the time counter t←t+1.
5. Obtain new residual crosstalk estimates $\hat{E}_{n,a}^{k}[t]$. If not sufficiently small to avoid SNR loss on showtime lines, go to step 4. Else, end.

It should not normally be necessary to repeat step 4. However, the check in step 5 is still important in that if this condition is not satisfied, the stability of the showtime lines could be affected.

During O-P-VECTOR-2, we obtain crosstalk estimates $\hat{E}_{a,S}$, residual crosstalk from the showtime lines into the activating line. The precoder matrix is updated in order to drive this residual crosstalk toward zero, while maintaining low residual crosstalk between other lines. Once this step is finished the activating line should experience a nearly crosstalk-free channel, which is then characterized during Channel Analysis.

In this phase, the multiplicative update of the precoder matrix proceeds in the following manner:
1. Set the time counter to t=0.
2. Initialize the off-diagonal elements of row a of the precoder, using either zeros or using a priori estimates (e.g., from historical information). That is, in the former case, set $C_{a,n}[t]=0$ for all n∈S.
3. Obtain residual crosstalk estimates $\hat{E}_{a,n}^{k}[t]$ for all n∈S and all tones k.

4. For all tones k and lines n∈S, update column n of the precoder:
  (a) For all lines m∈S∪{a}, compute $C_{m,n}^k[t+1]=C_{m,n}^k[t]-\hat{E}_{m,n}^k C_{m,n}^k[t]$
  (b) Column m of C[t+1] may now go live, i.e., be used for precoding.
  (c) Increment the time counter t←t+1.
5. Optionally, obtain new residual crosstalk estimates $\hat{E}_{n,a}^k[t]$, and repeat step 4 if new residuals are not sufficiently small.

In the upstream direction, there are again two estimation phases, which can potentially take place during G.vector phases R-P-VECTOR-1 and R-P-VECTOR-2. These are designed such that, during R-P-VECTOR-1, one can obtain the crosstalk $\hat{E}_{Sa}$ from the activating line and update the corresponding postcoder elements $C_{Sa}$, and such that during R-P-VECTOR-2, one can obtain the crosstalk $\hat{E}_{aS}$ into the activating line and update the corresponding postcoder elements $C_{aS}$. However, unlike the downstream case, in the upstream one can obtain all of the relevant crosstalk estimates $\hat{E}_{Sa}$ and $\hat{E}_{aS}$ at the same time, because the receiver and VCE are co-located. This means that all of the updating can be done during R-P-VECTOR-1. It is in fact advantageous to do so, in order to avoid second order effects that can degrade the SNR of Showtime lines. The multiplicative update of the precoder therefore proceeds in the following manner:

1. Set the time counter to t=0.
2. Initialize column a and row a of the precoder, using either corresponding entries from an identity matrix, or using a priori estimates (e.g., from historical information). That is, in the former case, set $C_{a,n}^k[t]=0$ and $C_{n,a}^k[t]=0$ for all n∈S, and set $C_{a,a}^k[t]=1$.
3. Obtain residual crosstalk estimates $\hat{E}_{a,n}^k[t]$ and $\hat{E}_{n,n}^k[t]$ for all n∈S and all tones k. It is assumed that the frequency equalization (FEQ) for the activating line has already been properly initialized at this point, so that $R_{a,a}^k[t]=1$ and hence $E_{a,a}^k[t]=0$.
4. For each tone k, compute the complex scalar factor $$z^k = \frac{1}{\left(1 - \sum_{p \in S} \hat{E}_{a,p}^k[t]\hat{E}_{p,a}^k[t]\right)}.$$

5. Update row a of the postcoder:

$$C_{a,n}^k[t+1] = z^k\left(C_{a,n}^k[t] - \sum_{p \in S} \hat{E}_{a,p}^k C_{p,n}^k[t]\right)$$

for all n∈S∪{a} and for all tones k. This protects the activating line from the showtime lines.

6. Protect the showtime lines by subtracting scaled copies of row a from all other rows. For each n∈S and for all tones k, update row n as follows:
  (a) For each m∈S∪{a}, let $C_{n,m}^k[t+1]=C_{n,m}^k[t]-\hat{E}_{n,a}^k C_{a,m}^k[t+1]$
7. Optionally obtain new residual crosstalk estimates $\hat{E}_{n,a}^k$ and stop if new residuals are sufficiently small. If not sufficiently small, repeat from step 4.

Tracking

In this section, we consider an exemplary tracking scenario in which N members of a vectoring group are active with small residual crosstalk E, and we wish to make regular small updates to the precoder or postcoder matrices in order to further reduce the residual crosstalk, or to follow slow changes in crosstalk over time. We introduce a damping factor α∈(0,1]. Using α=1 gives the fastest convergence, while using α close to zero gives higher accuracy in the face of measurement noise. As in the deactivating and activating sections above, S denotes the set of lines in showtime, and $C_{SS}^k$ denotes the active portion of the precoder or postcoder on tone k, associated with these lines.

In the downstream direction, the multiplicative update proceeds in the following manner:
1. Obtain a matrix of residual crosstalk estimates $\hat{E}_{SS}^k$ for all tones k.
2. Update the precoder as $$C_{n,m}^k[t+1] = C_{n,m}^k[t] - \alpha \sum_{p \in S} C_{n,p}^k[t]\hat{E}_{p,m}^k$$

for all n, m∈S, and all tones k.

In the upstream direction, the multiplicative update proceeds in the following manner:
1. Obtain a matrix of residual crosstalk estimates $\hat{E}_{SS}^k$ for all tones k.
2. Update the postcoder as $$C_{n,m}^k[t+1] = C_{n,m}^k[t] - \alpha \sum_{p \in S} \hat{E}_{n,p}^k[t] C_{p,m}^k$$

for all n, m∈S, and all tones k.

Another example of a multiplicative update process for the tracking scenario in the downstream direction is as follows. Let $E_t$ denote the error at step t. Then pre-multiplying the precoder matrix by $$I + \alpha_t A_t$$

is equivalent to modifying the error so as to become $$E_{t+1} = (I+E_t)(I+\alpha_t A_t) - I.$$

It is desirable to choose A so as to reduce a specified matrix norm such as, for example, the Frobenius norm. The Frobenius norm of a square matrix A may be defined as follows:

$$\|A\|_F = \sqrt{\sum_{n,m} |a_{n,m}|^2},$$

that is, as the square root of the sum of the squared magnitudes of the elements of A. Using a selected recursion, motivated by assuming the error estimate is exact, we may define A in the following manner:

$$A_t = -(I+\hat{E}_t^\dagger)\hat{E}_t.$$

Improved tracking properties can also be obtained by letting $\alpha_t$ depend on the current estimate as follows:

$$\alpha_t = \alpha_t(\hat{E}_t),$$

or alternatively by letting $\alpha_t$ depend on the current estimate and one or more previous estimates. Again, by considering the noiseless case, where the error estimate is assumed exact, or other cases, $\alpha_t$ may be optimized. For example, $\alpha_t$ may be optimized so as to minimize the Frobenius norm of $E_{t+1}$.

The present example provides a different way of defining the auxiliary matrix and setting the update parameter α. While the multiplicative update process in this example is more complex than that of the previous downstream tracking example, it can advantageously ensure that the Frobenius norm of the error decreases from iteration to iteration if the crosstalk estimates are sufficiently accurate.

In other implementations, alternative measures of the degree of error may be used. For example, the Frobenius norm might be replaced with a positive weighted sum of the squared Euclidean norm of the rows.

It is to be appreciated that the exemplary deactivation, activation and tracking scenarios above, and the associated multiplicative update processes, are presented for purposes of illustration only, and should not be construed as limiting the scope of the invention in any way. Alternative embodiments may use different precoder or postcoder update scenarios, and different arrangements of multiplicative update process steps. For example, the disclosed techniques can be adapted for use in scenarios involving simultaneous deactivation or activation of multiple lines, which may involve perform multiple instances of the above-described single-line procedures sequentially.

The multiplicative update processes in the above embodiments advantageously avoid transient SNR loss during activation and deactivation, and also help to improve estimation accuracy and convergence speed. In general, the quantitative advantages increase as the number of DSL lines in the system increases.

The various elements of the vector processor 315 can be implemented in a straightforward manner using a single FPGA, such as, for example, an Altera Stratix IV GX or GT FPGA, as would be appreciated by one skilled in the art. Other arrangements of one or more integrated circuits or other types of vectoring circuitry may be used to implement a vector processor in accordance with an embodiment of the present invention.

The illustrative embodiments advantageously provide a substantial reduction in the processor and memory resources required for performing pre-compensation and post-compensation operations in vectored DSL systems, thereby permitting use of much larger groups of vectored lines than would otherwise be possible. Also, the required computation time per tone is significantly reduced. DSL systems implementing the disclosed techniques exhibit reduced cost, lower power consumption, and enhanced throughput performance relative to conventional arrangements.

Embodiments of the present invention may be implemented at least in part in the form of one or more software programs that are stored in a memory or other processor-readable medium of AN 102 of system 100. Such programs may be retrieved and executed by a processor in the AN. The processor 115 may be viewed as an example of such a processor. Of course, numerous alternative arrangements of hardware, software or firmware in any combination may be utilized in implementing these and other systems elements in accordance with the invention. For example, embodiments of the present invention may be implemented in a DSL chip or other similar integrated circuit device. Thus, elements such as transceivers 208, VCE 210 and vectoring signal processing module 212 may be collectively implemented on a single integrated circuit, or using multiple integrated circuits. As another example, illustrative embodiments of the invention may be implemented using multiple line cards of a DSLAM or other access node. The term "vectoring circuitry" as used herein is intended to be broadly construed so as to encompass integrated circuits, line cards or other types of circuitry utilized in implementing operations associated with crosstalk cancellation in a communication system.

It should again be emphasized that the embodiments described above are presented by way of illustrative example only. Other embodiments may use different communication system configurations, AN and NT configurations, communication channels, or compensation operations, depending on the needs of the particular communication application. In addition, the precoder or postcoder matrices need not be square matrices as in certain of the illustrative embodiments. Also, a variety of different processes may be used to implement multiplicative updates of a given precoder or postcoder matrix. Alternative embodiments may therefore utilize the techniques described herein in other contexts in which it is desirable to provide improved crosstalk control between multiple channels of a communication system.

By way of example, the disclosed techniques may be applied in wireless MIMO systems, and particularly those in which the channels are slowly varying so that it is appropriate to use multiple iterations to learn an optimal precoder matrix. Assume for purposes of illustration that a wireless MIMO system comprises N mobiles and M transmit antennas at a base station, with each mobile equipped with a single antenna. The channel matrix H in such a system may be estimated, for example, using pilots transmitted from the base station. The pilot errors are reported back to the base station which has sufficient time to adjust the precoder matrix as follows:

$$C = H^\dagger (HH^\dagger)^{-1}.$$

The precoder matrix may be normalized so as to constrain the actual power used. In another possible implementation, one may postcode received pilots from the mobiles and then iteratively adapt the postcoder matrix by multiplying by auxiliary matrices that are functions of the measured errors.

It should also be understood that the particular assumptions made in the context of describing the illustrative embodiments should not be construed as requirements of the invention. The invention can be implemented in other embodiments in which these particular assumptions do not apply.

These and numerous other alternative embodiments within the scope of the appended claims will be readily apparent to those skilled in the art.

What is claimed is:

1. A method of controlling crosstalk between channels of a communication system, comprising:

estimating crosstalk between channels of the system;

generating a compensation matrix based on the crosstalk estimates; and generating compensated signals based on the compensation matrix;

wherein the compensation matrix is generated using a multiplicative update process in which a previous version of the compensation matrix comprising one or more non-zero off-diagonal elements is updated by at least one of pre-multiplying by a first auxiliary matrix and post-multiplying by a second auxiliary matrix, a given one of the auxiliary matrices also comprising one or more non-zero off-diagonal elements;

wherein pre-multiplying by the first auxiliary matrix comprises performing multiplicative updates of entries of a precoder matrix on a column-by-column basis, at least one multiplicative update performed on entries of the precoder matrix on the column-by-column basis comprising subtracting from a column of the precoder matrix a multiple of at least one other column of the precoder matrix; and wherein post-multiplying by the second auxiliary matrix comprises performing multiplicative updates of entries of a postcoder matrix on a row-by row basis, at least one multiplicative update performed on entries of the postcoder matrix on the row-by-row basis comprising subtracting from a row of the postcoder matrix a multiple of at least one other row of the postcoder matrix.

2. The method of claim 1 wherein the multiplicative updates performed on entries of the precoder matrix on the column-by-column basis comprise subtracting a multiple of one column of the precoder matrix from another column of the precoder matrix.

3. The method of claim 1 wherein the step of generating compensated signals based on the compensation matrix comprises generating pre-compensated signals using the precoder matrix.

4. The method of claim 3 further comprising the step of transmitting the pre-compensated signals from an access node of system to respective network terminals of the system over respective ones of the channels.

5. The method of claim 1 wherein the multiplicative updates performed on entries of the postcoder matrix on the row-by-row basis comprise subtracting a multiple of one row of the postcoder matrix from another row of the postcoder matrix.

6. The method of claim 1 wherein the step of generating compensated signals based on the compensation matrix comprises generating post-compensated signals using the postcoder matrix.

7. The method of claim 6 further comprising the step of receiving uncompensated signals in an access node of the system from respective network terminals of the system over respective ones of the channels, wherein the post-compensated signals are generated from respective ones of the received uncompensated signals.

8. The method of claim 1, wherein the at least one multiplicative update performed on entries of the precoder matrix on the column-by-column basis comprises subtracting a multiple of two or more columns of the precoder matrix from another column of the precoder matrix.

9. A non-transitory computer-readable storage medium having embodied therein executable program code that when executed by a processor of an access node of the system causes the access node to perform the steps of the method of claim 1.

10. An apparatus comprising:
an access node configured to control crosstalk between channels of communication system;
wherein the access node comprises:
a plurality of transceivers; and
vectoring circuitry coupled to the transceivers;
the vectoring circuitry comprising a processor coupled to a memory and being operative to estimate crosstalk between the channels of the system, to generate a compensation matrix based on the crosstalk estimates, and to generate compensated signals based on the compensation matrix;
wherein the compensation matrix is generated using a multiplicative update process in which a previous version of the compensation matrix comprising one or more non-zero off-diagonal elements is updated by at least one of pre-multiplying by a first auxiliary matrix and post-multiplying by a second auxiliary matrix, a given one of the auxiliary matrices also comprising one or more non-zero off-diagonal elements;
wherein pre-multiplying by the first auxiliary matrix comprises performing multiplicative updates of entries of a precoder matrix on a column-by-column basis, at least one multiplicative update performed on entries of the precoder matrix on the column-by-column basis comprising subtracting a multiple of at least one column of the precoder matrix from at least one other column of the precoder matrix; and
wherein post-multiplying by the second auxiliary matrix comprises performing multiplicative updates of entries of a postcoder matrix on a row-by row basis, at least one multiplicative update performed on entries of the postcoder matrix on the row-by-row basis comprising subtracting a multiple of at least one row of the postcoder matrix from at least one other row of the postcoder matrix.

11. The method of claim 1, wherein the at least one multiplicative update performed on entries of the postcoder matrix on the row-by-row basis comprises subtracting a multiple of two or more columns of the postcoder matrix from another row of the postcoder matrix.

12. A communication system comprising the apparatus of claim 10.

13. The apparatus of claim 10 wherein the vectoring circuitry comprises:
a vector control entity operative to estimate the crosstalk between the channels of the system and to generate the compensation matrix; and
a vectoring signal processing module operative to generate the compensated signals based on the compensation matrix.

14. The apparatus of claim 10 wherein the processor comprises a vector processor configured to generate the compensated signals.

15. The apparatus of claim 14 wherein the vector processor comprises a column update module coupled to a precoder, and the compensation matrix comprises the precoder matrix utilized by the precoder to generate pre-compensated signals.

16. The apparatus of claim 15 wherein the column update module is configured to perform the multiplicative updates of entries of the precoder matrix on the column-by-column basis using the first auxiliary matrix.

17. The apparatus of claim 14 wherein the vector processor comprises a row update module coupled to a postcoder, and the compensation matrix comprises the postcoder matrix utilized by the postcoder to generate post-compensated signals.

18. The apparatus of claim 17 wherein the row update module is configured to perform the multiplicative updates of entries of the postcoder matrix on the row-by-row basis using the second auxiliary matrix.

19. The apparatus of claim 14 wherein the vector processor is implemented in the form of a single integrated circuit.

20. An integrated circuit comprising:
a vector processor operative to generate compensated signals based on a compensation matrix;
wherein the compensation matrix is generated based on estimates of crosstalk between channels of a communication system;
wherein the compensation matrix is generated using a multiplicative update process in which a previous version of the compensation matrix comprising one or more non-zero off-diagonal elements is updated by at least one of pre-multiplying by a first auxiliary matrix and post-multiplying by a second auxiliary matrix, a given one of the auxiliary matrices also comprising one or more non-zero off-diagonal elements;
wherein pre-multiplying by the first auxiliary matrix comprises performing multiplicative updates of entries of a precoder matrix on a column-by-column basis, at least one multiplicative update performed on entries of the precoder matrix on the column-by-column basis comprising subtracting a multiple of at least one column of the precoder matrix from at least one other column of the precoder matrix; and wherein post-multiplying by the second auxiliary matrix comprises performing multiplicative updates of entries of a postcoder matrix on a row-by row basis, at least one multiplicative update performed on entries of the postcoder matrix on the row-by-row basis comprising subtracting a multiple of at least one row of the postcoder matrix from at least one other row of the postcoder matrix.

21. A method of controlling crosstalk between channels of a communication system, comprising:

estimating crosstalk between channels of the system;

generating a compensation matrix based on the crosstalk estimates; and generating compensated signals based on the compensation matrix;

wherein the compensation matrix is generated using a multiplicative update process in which a previous version of the compensation matrix comprising one or more non-zero off-diagonal elements is updated by at least one of pre-multiplying by a first auxiliary matrix and post-multiplying by a second auxiliary matrix, a given one of the auxiliary matrices also comprising one or more non-zero off-diagonal elements; and wherein the auxiliary matrix comprises an approximate inverse of a resultant channel matrix, the auxiliary matrix being formed by subtracting a matrix based at least in part on a residual channel matrix from an identity matrix.

22. The method of claim 21, wherein the auxiliary matrix is formed by subtracting a scaled version of the residual channel matrix from an identity matrix.

23. The method of claim 21, wherein the auxiliary matrix is formed by subtracting a portion of the residual channel matrix from an identity matrix.

24. The method of claim 21 wherein the auxiliary matrix is formed by subtracting the residual channel matrix from an identity matrix.

* * * * *